(No Model.)
C. A. RUSSELL.
FORK ATTACHMENT.
No. 545,536. Patented Sept. 3, 1895.
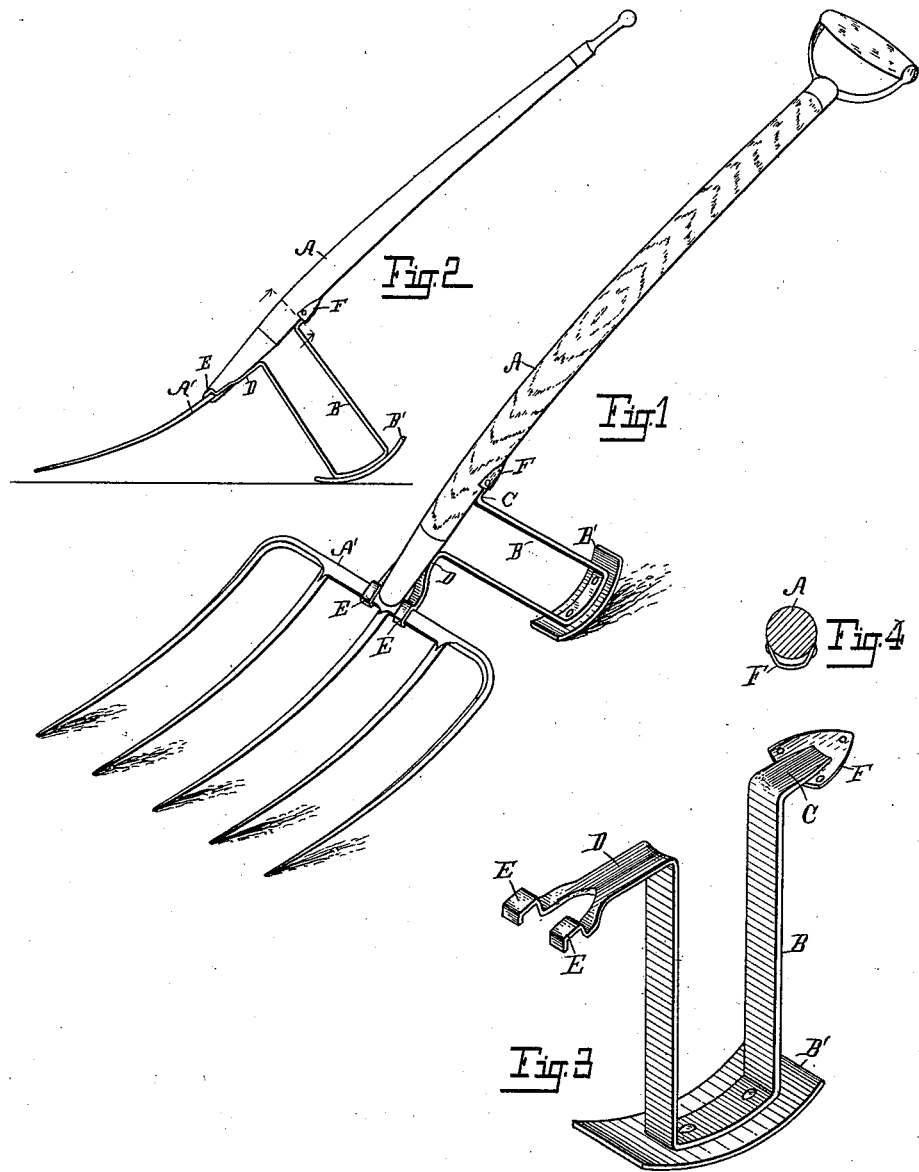
Witnesses:
Walter S. Wood
Mannie Longyear
Inventor,
Charles A. Russell
By Fred L. Chappell,
Att'y.

UNITED STATES PATENT OFFICE.

CHARLES A. RUSSELL, OF OTSEGO, MICHIGAN.

FORK ATTACHMENT.

SPECIFICATION forming part of Letters Patent No. 545,536, dated September 3, 1895.

Application filed January 18, 1895. Serial No. 535,422. (No model.)

*To all whom it may concern:*

Be it known that I, CHARLES A. RUSSELL, a citizen of the United States, residing at the village of Otsego, in the county of Allegan and State of Michigan, have invented a certain new and Improved Fork Attachment, of which the following is a specification.

My invention relates to improvements in forks, and more particularly to a detachable fulcrum for forks to adapt them for use for digging purposes, such as for digging potatoes.

The objects of my invention are, first, to provide a fork which can be conveniently used for the ordinary purposes of a stable-fork and like uses, and by providing an attachment to adapt the same fork for use for digging purposes, such as digging potatoes; second, to provide an attachment for an ordinary fork which shall transform the same into an improved digging-fork; third, to provide an improved fulcrum for a fork; and, fourth, to provide improvements in digging-forks that will make them very easy for continual operation. I accomplish these objects of my invention by the device shown in the accompanying drawings, in which—

Figure 1 shows a perspective view of my improved fork. Fig. 2 shows a side elevation of the same, showing the relation of the parts to the ground line when in use. Fig. 4 is a cross-section of the fork on line 4 4 of Fig. 2. Fig. 3 is an enlarged detail view of the attachment and clip for holding the same removed from the fork.
In the drawings similar letters of reference refer to similar parts throughout the several views.

A represents the handle of the fork.

A' represents the cross portion at the top of the tines from which the tines project.

The fulcrum is composed of a strip of spring steel which is divided into two hooks which engage the cross portion A' of the fork to each side of the shank or handle. A portion D extends along under the shank or handle and is then bent down nearly at right angles to the fork, as at B, and returns to the handle, and the projecting portion C is adapted to spring into a little socket F, fastened by suitable means to the under side of the handle. A broadened curved shoe B' is placed on the under side of the fulcrum. The curved shoe B' is at an angle to a line in the general direction of the fork, the lower part being closer to the fork.

It will be observed by examining Fig. 2 that in the operation, when the fork is struck into the ground, the lower portion of the fulcrum is close to the load, giving the operative great advantage, and when he presses the handle down to raise the load the curved shoe carries the point of the leverage back and permits a rapid raising of the load after it is broken from the ground, when it can be shaken and the potatoes or other roots separated from the soil and left on the surface. It will be perceived that this construction is of great advantage in this way. All that is required to do to detach the fulcrum is to press the sides B together, when the point C will be removed from the socket F and the hooks E can be readily unhooked, making it very convenient to remove. It can, of course, be attached by reversing this process. When the fulcrum is removed, the fork has the same appearance as an ordinary fork and can be used in the ordinary way, the attachment only being desirable for digging and heavy lifting with the fork. It will be observed by examining Fig. 2 that the handle of the fork needs to be only a little lowered to raise the tines from the ground, the fulcrum acting quickly in that way, and that on account of the great leverage obtained only a slight pressure downward is required. This prevents the intense weariness occasioned in digging with forks as heretofore constructed.

Having thus described my invention, what I claim as new, and desire to secure by Letters Patent, is—

1. The combination, with the fork, of the fulcrum of curved spring steel adapted to hook over the cross portion of the fork to each side of the handle and engage the under side of the handle to support and strengthen it; a socket to receive the upper end of the fulcrum to retain the same in place upon the handle, for the purpose specified.

2. The combination, with the fork, of a fulcrum consisting of a spring portion, B, doubled to project downwardly and rearwardly therefrom, with hooks, E, E, thereon formed to engage over the head of the fork, A', with a rest, D, to engage under the lower end of the fork handle and serve to support and strengthen the same at that point; a socket, F, to receive the upper end of the fulcrum so that the fulcrum can be detached by merely compressing the sides of the loop, B, together and unhooking it from the handle, or attached by hooking it over the handle and compressing the same so that the end shall engage in the socket, as specified.

In witness whereof I have hereunto set my hand and seal in the presence of two witnesses.

CHARLES A. RUSSELL. [L. S.]

Witnesses:
  CHANCEY A. BARNES,
  GEO. W. BINGHAM.